United States Patent
Allard et al.

(10) Patent No.: US 6,509,398 B1
(45) Date of Patent: Jan. 21, 2003

(54) PHOTOPOLYMERIZABLE ACRYLIC LACQUER COMPOSITIONS

(75) Inventors: Maxime M. Allard, Burago di Molgora (IT); Cyrille M. Jaecques, Schweighouse S/Moser (FR)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/763,556

(22) PCT Filed: Aug. 27, 1999

(86) PCT No.: PCT/EP99/06329
§ 371 (c)(1),
(2), (4) Date: Mar. 12, 2001

(87) PCT Pub. No.: WO00/12635
PCT Pub. Date: Mar. 9, 2000

(30) Foreign Application Priority Data

Aug. 28, 1998 (FR) .............................. 98 10825

(51) Int. Cl.$^7$ .............................. C08K 5/34; C08K 5/20; C08K 5/36
(52) U.S. Cl. .................. 524/91; 524/100; 524/230; 524/289; 524/291; 524/303; 524/342; 524/343; 524/351; 428/412; 428/500
(58) Field of Search .......................... 524/91, 100, 230, 524/289, 291, 303, 342, 343, 351; 428/412, 500

(56) References Cited

U.S. PATENT DOCUMENTS 4,279,720 A * 7/1981 Berner .................. 204/159.23

FOREIGN PATENT DOCUMENTS

| EP | 0 256 765 A1 | 8/1987 | ............. D01F/8/10 |
| EP | WO 96/23836 | 8/1996 | ............. C08J/7/18 |
| JP | 58071997 | 4/1983 | ............. C10M/3/14 |
| JP | 61036375 | 2/1986 | ............. C09D/3/80 |
| JP | 03087744 | 4/1991 | ............. G03F/7/004 |
| JP | 071333338 | 5/1995 | ............. C08G/59/32 |
| JP | 08283608 | 10/1996 | ............. C09D/4/00 |

OTHER PUBLICATIONS

Patent Abstracts of Japan vol. 16, No. 455, Sep. 22, 1992. JP 04 159353 A (Kanegafuchi Chem. Ind. Co. LTD.) Jun. 2, 1992.

Patent Abstracts of Japan vol. 10, No. 194, Jul. 8, 1986 & JP 61 036375 A Nippon Telegr. & Teleph. Corp. NNT Feb. 21, 1986.

Patent Abstracts of Japan vol. 95, No. 08, Sep. 29, 1995 & JP 07 133338 A Sumitomo Chem. Co. LTD., May 23, 1995.

Patent Abstracts of Japan vol. 15, No. 266, Jun. 5, 1991 & JP 03 087744 A Asahi Chem. Ind. Co. LTD., Apr. 12, 1991.

Patent Abstracts of Japan vol. 97, No. 02, Feb. 28, 1997 & JP 08 283608 A Mitsubishi Rayon Co. LTD., Oct. 29, 1996.

Patent Abstracts of Japan vol. 96, No. 02, Feb. 29, 1996 & JP 07 258599 A Tonen Corp., Oct. 9, 1995.

Patent Abstracts of Japan vol. 017, No. 233, May 12, 1993 & JP 04 361037 A Asahi Chem. Ind. Co. LTD., Dec. 14, 1992.

* cited by examiner

Primary Examiner—Kriellion A. Sanders

(57) ABSTRACT

The present invention relates to photopolymerizable acrylic varnish compositions.

11 Claims, No Drawings

PHOTOPOLYMERIZABLE ACRYLIC LACQUER COMPOSITIONS

The present invention relates to novel photopolymerizable acrylic varnish compositions.

The invention is especially suitable for varnishes for coating substrates comprising polycarbonate or polymethyl methacrylate (PMMA).

It is known that the weathering stability of paints and varnishes may be improved by using mixtures of UV absorbers of the benzotriazole type and what are known as HALS (Hindered Amine Light Stabilizer) compounds, which are light stabilizers of the sterically hindered amine type.

As a benzotriazole, mention may be made of 2-(2'-hydroxy-5'-methylphenyl)benzotriazole with the formula

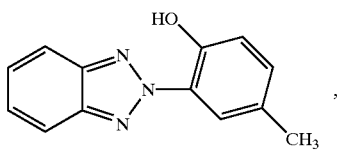

the CAS number 2440-22-4, and a molecular weight of 225.

As HALS compound use is very frequently made of HALS compounds of type 1, such as bis(2,2,6,6-tetramethyl-4-piperidyl) sebacate with the formula

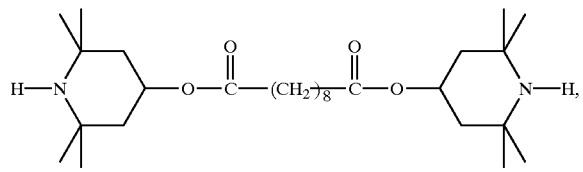

the CAS number 52829-07-9, and a molecular weight of 481,
or HALS compounds of type 2, such as, in particular, bis(1,2,2,6,6-pentamethyl-4-piperidinyl) sebacate with the formula

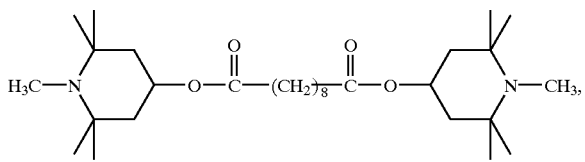

the CAS number 41556-26-7, and a molecular weight of 509.

The stabilization of photopolymerizable acrylic varnishes is known to be generally more problematic. In acrylic varnish formulation technology it is in fact well known that a certain number of stabilizers which are intended to restrict the color variations and the loss of transparency of the varnishes must be incorporated into these varnishes. Certain known stabilizers, however, may adversely affect the adhesion properties of the varnish on the substrate.

For instance, the use of benzotriazole derivatives is accompanied by an inhibition of polymerization both on the surface and in the core of the product. Furthermore, the basicity of the HALS compounds of type 1 leads, additionally, to detachment phenomena in the course of resistance testing under wet heat conditions.

Moreover, the choice of stabilizers also depends to a large extent on the hardness of the acrylic varnish.

For instance, a general distinction is made between the following:

"Hard" varnishes having a Persoz hardness in accordance with NFT standard 30016 of more than 300 seconds, which were the first varnishes to be used at all. These varnishes may comprise two-component varnishes, which are generally heat-cured, or "UV varnishes", which are cured under UV radiation. These varnishes are generally applied in a thin film, whose thickness is generally from 5 to 15 µm.

"Elastic" or "flexible" varnishes having a Persoz hardness of less than 120 seconds, which are in turn subdivided into two classes:

two-component varnishes of the crosslinked polyurethane (PU) type, which are heat-cured at temperatures between 120 and 130° C. over a period of about 40 to 60 minutes, and "UV" varnishes, which are cured under ultraviolet radiation.

These elastic or flexible varnishes belong to the class of the "self-healing" varnishes.

In the particular case of the application of the acrylic varnishes to polycarbonate substrates, especially in the case of varnishes for vehicle headlamps, it must be borne in mind when formulating the varnishes that the polycarbonate, owing to its structure, is highly susceptible to yellowing on weathering. It is therefore necessary to add products to the varnish composition which stabilize the varnish itself to yellowing and damage by cracking as a consequence of depolymerization of the polymer chains. The addition of UVA and UVB filters to the varnish is therefore obligatory. Their concentration in the varnishes is restricted, however, by the fact that the absorbers possess an intrinsic color and, owing to their sluggish reactivity, act as plasticizers, leading to bleeding phenomena or to a reduction in the chemical resistance of the varnish. On bleeding, moreover, transparency is lost. At a given concentration, therefore, the protection of the polycarbonate depends heavily on the remaining thickness. This relationship obeys the Lambert-Beer law. This means, in other words, that, applied at a low thickness, the UV filter concentration must be increased very rapidly, which adversely affects the performance properties of the varnish and makes it unsuitable for use for UV polymerization.

In the international patent application WO 96/23836 it has already been proposed to use mixtures of triazines and neutral HALS compounds of type 2 for photopolymerizable elastic varnishes which are intended in particular for protecting glazing made from synthetic plastic material. However, these same UV absorber systems are unsuitable for varnish formulations of the urethane acrylate type for the preparation of hard varnishes, especially varnishes having a Persoz hardness of more than 300 seconds.

It is found that, when attempts are made to use the UV absorber systems developed in the field of the abovementioned elastic varnishes for hard varnishes, it is impossible to achieve acceptable adhesion conditions without pretreating the substrate or using a primer which promotes the adhesion of the varnish to the substrate.

In the course of our own investigations it has now been found that, by replacing the HALS compounds by antioxidants from the class of the sterically hindered phenols, it is possible to obtain an improvement in the optical properties without any deterioration in the varnish adhesion properties observed with the presence of HALS compounds in the case of hard varnish compositions.

By hindered phenols are meant, here, a well-known class of phenol derivatives which are widely employed as antioxidants.

The derivatives of the sterically hindered phenol type used in accordance with the invention comprise oligomerized, dimerized or substituted derivatives of methyl-2,6-di-tert-butyl-4-methylphenol. The substituents are generally selected from alkyl groups having preferably 6 to 18 carbon atoms, isocyanurate, triazine, thioalkyl, amino or cycloamino.

The 4-methylphenol may be dimerized or oligomerized with itself or with cyclopentadiene derivatives and also with various substituents, as defined in particular in "Plastics Additives Handbook", R. Gätcher and H. Müller, edition 3/1990, page 40–50.

These products are commercially available as stabilizers for thermoplastic polyolefins, low density polyethylene (LDPE), high density polyethylene (HDPE), polypropylene, poly-4-methylpentene and polybutylene to counter oxidation and degradation of these polymers, and they serve primarily as stabilizers during the processing of these polymers and subsequently as stabilizers for preventing depolymerization.

As already mentioned above, the present invention is based on the surprising discovery that these particular antioxidants, which have never before been used in acrylic varnish formulations, may be used in acrylic varnish formulations and, in particular, in formulations for hard acrylic varnishes, especially acrylic varnishes for protecting polycarbonate or PMMA surfaces, without these formulations being destabilized during photochemical polymerization, especially during polymerization under UV radiation, and without the varnish adhesion properties being adversely affected during the aging of this varnish under wet heat conditions.

In accordance with one of its substantial features, the invention accordingly provides a photopolymerizable unsaturated acrylic varnish composition which comprises an antioxidant from the class of the sterically hindered phenols.

The sterically hindered phenol is selected advantageously from products having a molecular mass of more than 300.

As examples of products especially suitable for the implementation of the invention, mention may be made of the following products, which are listed below together with their molecular masses and their Chemical Abstracts number.

2,6-Di-tert-butyl-4-nonylphenol
M=333
CAS=4306-88-1

2,2'-Methylenebis(4-methyl-6-tert-butyl-phenol)
M=341
CAS=119-47-1

4,4'-Butylidenebis(2-tert-butyl-5-methyl-phenol)
M=383
CAS=85-60-9

4,4'-Thiobis(2-tert-butyl-5-methylphenol)
M=358
CAS=96-69-5

2,2'-Thiobis(6-tert-butyl-4-methylphenol)
M=358
CAS=90-66-4

Octadecyl 3-(3',5'-di-t-butyl-4'-hydroxy-phenyl) propionate
M=531
CAS=2082-79-3

Tetrakismethylene(3,5-di-t-butyl-4-hydroxy-hydrocinnamate)methane
M=1178
CAS=6683-19-8

Tris(3,5-di-t-butyl-4-hydroxybenzyl)-isocyanurate
M=784
CAS=27676-62-6

2,2'-Thiodiethylbis(3,5-di-tert-butyl-4-hydroxyphenyl) propionate
M=642
CAS=41484-35-9

1,1,3-Tri(2'-methyl-4'-hydroxy-5'-tert-butylphenyl) butane
M=545
CAS=1843-03-4

2,2'-Methylenebis-6-(1-methylcyclohexyl)-para-cresol
M=421
CAS=77-62-3

2,4-Dimethyl-6-(1-methylcyclohexyl)phenol
M=218
CAS=77-61-2

N,N'-Hexamethylenebis(3,5-di-tert-butyl-4-hydroxyhydrocinnamamide)
M=637
CAS=23128-74-7

Triethylene glycol bis(3-tert-butyl-4-hydroxy-5-methylphenyl)propionate
M=587
CAS=36443-68-2 and also sterically hindered polymeric phenols. One example of such products is a polymer having a molecular weight of between 700 and 800 and the CAS number 68610-51-5, which is sold under the trademark Lowinox® CPL by the company Great Lakes.

Of these products, it is advantageous to choose the sterically hindered phenol of the following formula (I):

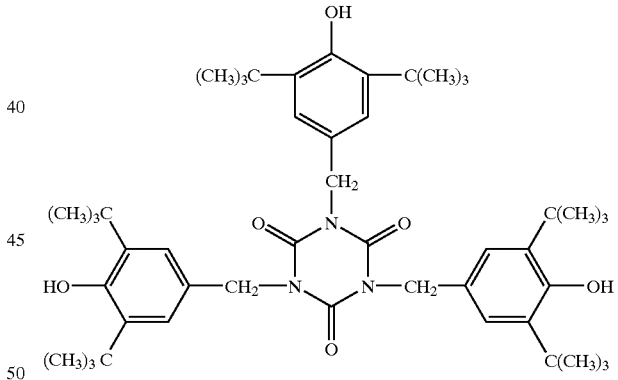

(I)

This product has the CAS number 2 27 676-62-6 and possesses a molecular mass of 784. It comprises a hindered phenol which may be also be regarded as a mixture of isocyanurate and triazines with alkylphenol substituents.

The compositions of the invention advantageously contain the sterically hindered phenol in an amount of from 0.05 to 0.4% by weight, based on the solids content of the composition.

As already seen above, the invention relates to all photopolymerizable, unsaturated acrylic varnishes, especially all UV-photopolymerizable, unsaturated acrylic varnishes.

As unsaturated acrylic derivatives, which form an essential constituent of these compositions, varnishes of this kind generally comprise acrylic derivatives selected from the unsaturated acrylic derivatives having a urethane, polyester or acrylate structure. These varnishes are advantageously composed substantially of the following constituents:

Polyol Esters Such as:

ditrimethylolpropane tetra- or triacrylate,
trimethylolpropane triacrylate,
pentaerythritol tetra- or triacrylate,
pentaerythritol alkoxy tetra- or triacrylate,
dipentaerythritol penta- or hexaacrylate,
acrylic polyester polyols in general.

Polyurethane Acrylates Such as:

Derivatives of polyols modified with aliphatic isocyanates such as IPDI, HDI, HMDI, with hydroxyethyl acrylate or hydroxybutyl acrylate termination.

Acrylic Acrylates Such as:

acrylic prepolymers whose hydroxyl groups are esterified with acrylic acid.

Furthermore, they additionally comprise the additives which are customary in compositions for the preparation of acrylic varnishes.

The compositions of the invention therefore advantageously comprise surface-active additives such as polysiloxane derivatives, monofunctional acrylic monomers for improving the varnish adhesion, adhesion promoters, especially in the form of carboxylated oligomers or methacryloylphosphoric acid derivatives, and photoinitiators for triggering polymerization under a UV lamp.

Furtherore, besides the sterically hindered phenol, the compositions of the invention advantageously comprise other stabilizers as well.

In particular, they further comprise at least one UV absorber from the class of the triazines, preferably a triazine having one of the following structures:

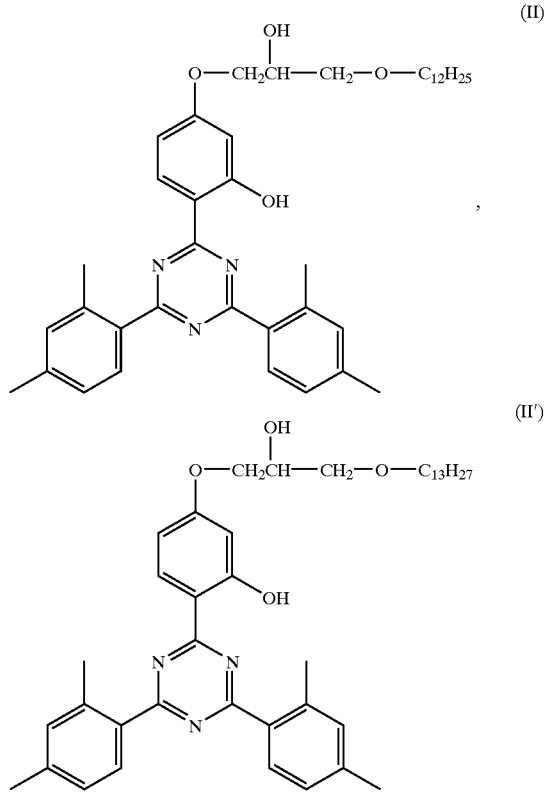

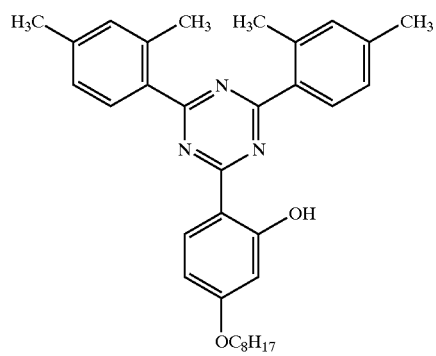

A mixture of the products of the above formulae (II) and (II') is available commercially under the trademark Tinuvin® 400.

The product of the formula (III) is available under the trademark Cyagard® UV-1164L, the $C_{18}H_{17}$ group comprising a mixture of isomeric isooctyl groups.

Moreover, the varnish compositions of the invention further comprise at least one UV absorber from the class of the benzotriazoles. Of these, mention may be made in particular of 2-(2'-hydroxy-5-methylphenyl)benzotriazole having a molecular weight of 225 and the CAS number 2440-22-4.

Examples that may be mentioned of commercially customary products which are especially suitable as benzotriazoles for the acrylic varnish compositions of the invention are the commercial products with the trademark Lowilite® 55 or Tinuvin® P.

In the compositions of the invention, these benzotriazoles are present preferably in a concentration of between 0.2 and 0.5% by weight, based on the solids content of the composition.

In a particularly advantageous embodiment, the coating compositions of the invention comprise simultaneously a sterically hindered phenol, at least one triazine, and at least one benzotriazole, in the proportions indicated above.

In the choice of the proportions of these various constituents, account is taken of the fact that the triazine may give rise to bleeding or hazing, as a result of incompatibility with the polymer matrix after polymerization and aging under wet heat conditions, and that the benzotriazole derivatives alone may inhibit the polymerization reaction, since they absorb at wavelengths between 360 and 390 nanometers. These triazole derivatives are therefore used advantageously in relatively small amounts and as a supplement to an absorber of the triazine type.

As already mentioned above, the invention provides a possibility of stabilizing any acrylic varnishes, including both elastic and hard acrylic varnishes. The invention is particularly advantageous, however, in the case of compositions for hard acrylic varnishes in which the presence of sterically hindered phenol makes it possible to remedy the disadvantage that HALS compounds cannot be used to improve the transparency in the compositions without adversely affecting the varnish adhesion properties.

In accordance with one of its other substantial features, therefore, the invention relates to the use of a sterically hindered phenol as defined above as a stabilizer for a photopolymerizable acrylic varnish for the purpose of preventing the loss of adhesion of the varnish on a substrate.

The invention is especially suitable for the adhesion of acrylic varnishes to polycarbonate or PMMA substrates. As already evident from the above remarks, it is suitable in a particularly advantageous manner for the application of a hard acrylic varnish, i.e., an acrylic varnish having a Persoz hardness in accordance with NFT standard 300 16 of more than 300 seconds.

The example which follows is intended to illustrate the invention without restricting it.

EXAMPLE a) Preparation of Compositions

An acrylic varnish composition A is prepared, having the following weight fractions in percent:

polyfunctional polyester urethane acrylate (Ebecryl® 1290): 45% hydroxylated PETA tetraacrylate (Servocure® RTT 192): 39.8% hydroxypropyl methacrylate: 10% siloxane acrylate (Actilane® 800): 1.3% siloxane polyester (PA 57): 0.35% methyl benzoylformate: 3.35%.

Subsequently, using this composition A, different mixtures 1 to 6 are prepared, having the concentrations indicated below in percent by weight, with reference to the solids content of the composition.

Mixture 1:

0.60% of a triazine mixture (Tinuvin® 400), referred to below as T400

Mixture 2:

0.50% of a different triazine (Cyagard® UV-1164L), referred to below as C1164L

Mixture 3 (Inventive):

0.50% C1164L, 0.25% of a benzotriazole (Lowilite 55), referred to below as L55

0.25% of a sterically hindered phenol comprising a mixture of isocyanurate and triazines with alkylphenol substituents in accordance with formula (I) above, or tris(3,5-di-t-butyl-4-hydroxybenzyl) isocyanurate (this product is available commercially under the commercial designation Anox® IC 14 or Irganox® 3114)

Mixture 4:

0.5% triazine C1164L 0.25% L55

0.25% tris-p-nonylphenyl phosphate (available commercially under the trademark Alkanox® TNPP)

Mixture 5:

0.60% T400, 0.25% of a HALS compound of type 2 (Sanduvor® 3058)

Mixture 6:

0.60% T400 and 0.25% of a polymeric HALS compound available commercially under the trademark Uvasil® 816.

b) Production of Varnished Polycarbonate Sheets

These different varnish compositions are used to coat polycarbonate sheets.

The different varnish compositions above are applied by a spray gun so as to give a film 10±2 μm thick. Then, for evaporation of the solvent, the sheets are placed in an oven at 60° C. for 5 minutes. Subsequently, polymerization is performed under a UV lamp with an energy of 3 J±0.5 J/cm$^2$. Polymerization takes place under a mercury vapor lamp doped with lead iodide. This lamp features strong emission at wavelengths of 365–385 and 400–410 nanometers.

c) Testing of the Coated Sheets

The sheets thus varnished are then subjected first to accelerated aging tests, which allow the variations in the colors of the varnish to be assessed, and secondly to aging tests under wet heat conditions, for the purpose of assessing the adhesion of the varnish to the substrate.

1) Accelerated Aging Tests

These tests are conducted in an Atlas Weatherometer Wom C1 3000 in accordance with Iso standard 11341.

In these tests, the variations in the color coordinates after 1000 hours are measured, more precisely the variations in the luminescence (δL), the green coloration (δa), the yellow coloration (δb) and the total color (δE).

2) Adhesion Tests

Adhesion testing is carried out using a high-pressure cleaner which operates at 85° C. under 85 to 95 bar and at a pH of 8 to 9. The nozzle is positioned at a distance of 10 cm from the test panel.

In this test, varnished sheets are subjected to successive hot/cold cycles each comprising:

16 h at 85° C. and 95% humidity, 3 h at −20° C., and 6 h at 85° C. with dry heat.

The adhesion is considered good if, following application of 7 hot/cold cycles and testing by washing with the high-pressure cleaner, there is no detachment of the varnish.

The results of the adhesion tests and aging tests are listed in the table below. In the column relating to the adhesion, the symbol "+" means that the varnish has not detached following application of 7 hot/cold cycles. By contrast, a number indicates the number of cycles until detachment occurs.

TABLE

| EXPERIMENT | ADHESION (hot/cold cycle) | AGING (Wom, 1000 hours) | | | |
|---|---|---|---|---|---|
| | | δL | δa | δb | δE |
| A | + | 1.9 | −0.9 | 2.7 | 3.4 |
| 1 | + | −0.3 | −0.4 | 1.1 | 1.2 |
| 2 | + | 0.9 | −0.2 | 0.1 | 0.9 |
| 3 | + | −0.5 | −0.1 | 0 | 0.5 |
| 4 | 4 | 0.2 | −0.4 | 0.7 | 0.8 |
| 5 | 3 | | | | |
| 6 | 3 | | | | |

As is evident from the table, the product A possesses good adhesion initially and after the wet heat aging cycles. After 1000 hours of treatment (in the WOM) however, the sheets treated with the varnish A exhibit unacceptable discoloration, in particular strong color variation, yellowing and loss of transparency.

The addition of the UV absorber of the triazine type results in no detachment at all during the wet heat cycle and in particular permits a reduction in yellowing.

The supplementary addition of a benzotriazole derivative makes it possible to improve the resistance of the varnish and to suppress the yellowing almost completely without adversely affecting the adhesion, although bleaching of the varnish still occurs and the system loses transparency, followed by cracking.

The addition of HALS compounds, even at levels of only 0.25%, results in a loss of adhesion during the hot wet cycles. The replacement of these HALS compounds by a derivative of the sterically hindered phenol type (mixture 3), more precisely in this case a mixture of isocyanurate and triazines with alkylphenol substituents (tris(3,4-di-t-butyl-4-hydroxybenzyl) isocyanurate), makes it possible to achieve outstanding aging conditions, since the color variations are very low and the adhesion is retained after 7 hot/cold cycles.

What is claimed is:

1. A photopolymerizable unsaturated acrylic coating composition, comprising an acrylic polymer and an antioxidant comprising a sterically hindered phenol, wherein a film formed from the acrylic polymer has a Persoz hardness, as measured by NF T30-016, of more than 300 seconds.

2. The composition as claimed in claim 1, wherein the sterically hindered phenol has a molecular mass of more than 300.

3. The composition as claimed in claim 1 wherein said sterically hindered phenol is selected from the group consisting of 2,6-di-tert-butyl-4-nonylphenol, with a molecular mass (M) of 333; 2,2'-methylenebis(4-methyl-6-tert-butylphenol), M=341; 4,4'-butylidenebis(2-tert-butyl-5-methyl-phenol), M=383; 4,4'-thiobis(2-tert-butyl-5-methylphenol), M=358; 2,2'-thiobis(2-tert-butyl-4-methylphenol), M=358; octadecyl 3-(3',5'-di-t-butyl-4'-hydroxyphenyl)propionate, M=531; tetrakis-methylene(3,5-di-t-butyl-4-hydroxyhydrocinnamate)-methane, M=1178; tris(3,5-di-t-butyl-4-hydroxybenzyl)isocyanurate, M=784; 2,2'-thiodiethylbis(3,5-di-tert-butyl-4-hydroxyphenyl)-propionate, M=642; 1,1,3-tri(2'-methyl-4'-hydroxy-5'-tert-butylphenyl)butane, M=545; 2,2'-methylenebis-6-(1-methylcyclohexyl)-para-cresol, M=421; 2,4-dimethyl-6-(1-methylcyclohexyl)phenol, M=218; N,N'-hexamethylenebis(3,5-di-tert-butyl-4-hydroxyhydrocinnamamide), M=587, and mixtures thereof.

4. The composition as claimed in claim 1, wherein the sterically hindered phenol corresponds to the following formula (I):

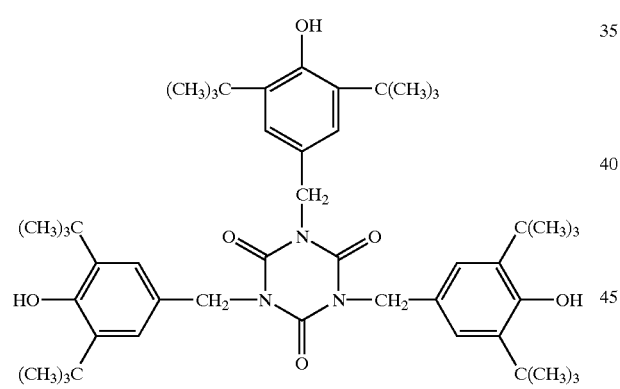

5. The composition as claimed in claim 1, wherein the concentration of the sterically hindered phenol, based on the solids content of the composition, is between 0.05 and 0.4% by weight.

6. The composition as claimed in claim 1, further comprising at least one acrylic derivative selected from the group consisting of unsaturated acrylic derivatives having a urethane, polyester or acrylate structure.

7. The composition as claimed in claim 1, further comprising a UV absorber selected from the group consisting of triazines and benzotriazoles.

8. The composition as claimed in claim 7, wherein the UV absorber is a triazine, wherein the triazine concentration, based on the solids content of the composition, is between 0.5 and 1% by weight.

9. The composition as claimed in claim 7, wherein the UV absorber is a benzotriazole, wherein the benzotriazole concentration, based on the solids content of the composition, is between 0.2 and 0.5% by weight.

10. The composition as claimed in claim 7, wherein the triazine is selected from the group consisting of triazines having the following structures:

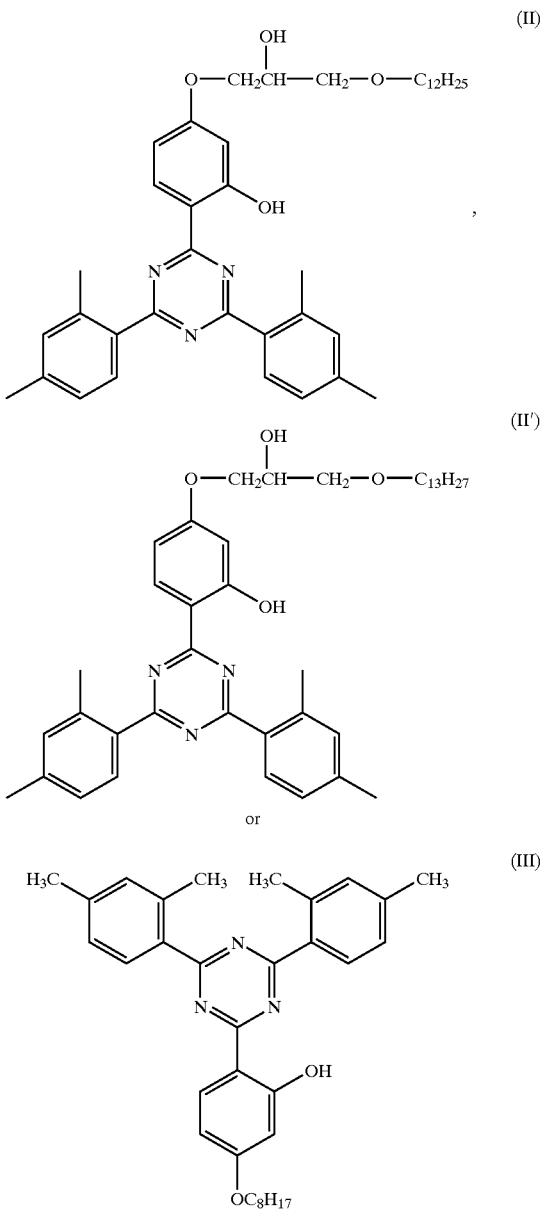

11. A polycarbonate or polymethyl methacrylate(PMMA) substrate comprising a coating disposed on the substrate, wherein the coating is formed from the acrylic coating composition of claim 1.

* * * * *

UNITED STATES PATENT AND TRADEMARK OFFICE
CERTIFICATE OF CORRECTION

PATENT NO. : 6,509,398 B1
DATED : January 21, 2003
INVENTOR(S) : Allard et al.

It is certified that error appears in the above-identified patent and that said Letters Patent is hereby corrected as shown below:

Column 9,
Line 28, after "N,N'-hexamethylenebis(3,5-di-tert-butyl-4-hydroxyhydrocinnamamide)", before "M=587", please insert -- M=637; triethylene glycol bis(3-tert-butyl-4-hydroxy-5-methylphenyl)-propionate, --.

Signed and Sealed this

Tenth Day of June, 2003

JAMES E. ROGAN
*Director of the United States Patent and Trademark Office*